United States Patent [19]
Hayashi

[11] Patent Number: 5,448,724
[45] Date of Patent: Sep. 5, 1995

[54] DATA PROCESSING SYSTEM HAVING DOUBLE SUPERVISING FUNCTIONS

[75] Inventor: Yoko Hayashi, Kawasaki, Japan

[73] Assignee: Fujitsu Limited, Kanagawa, Japan

[21] Appl. No.: 214,310

[22] Filed: Mar. 17, 1994

[30] Foreign Application Priority Data

Jul. 2, 1993 [JP] Japan .................................. 5-164484

[51] Int. Cl.⁶ .............................................. G06F 11/00
[52] U.S. Cl. ............................ 395/182.02; 395/187.01
[58] Field of Search .......................... 371/9.1; 395/575

[56] References Cited

U.S. PATENT DOCUMENTS 4,933,940 6/1990 Walter et al. ......................... 371/9.1

FOREIGN PATENT DOCUMENTS 62-231545 10/1987 Japan .
2-113741 4/1990 Japan .

OTHER PUBLICATIONS

Drake, Using SNMP to Manage Networks, IEE Colloquim on Designing Resilient Architectures, Digest No. 170, p. 2/1–4, 15 Nov. 1991.
Computer Dictionary, Microsoft Press, 2d Edition, 1994, pp. 32 (Defin. of Autopolling) and 293 (Defin. of Password and Password Protection).
Heberlein et al., Internetwork Security Monitor: An Intrusion Detection System for Large-Scale Networks, 15th National Computer Security Conf., 1992, at 262.

Primary Examiner—Robert W. Beausoleil, Jr.
Assistant Examiner—Alan M. Fisch
Attorney, Agent, or Firm—Staas & Halsey

[57] ABSTRACT

In a data processing system formed of a plurality of nodes each connected to networks, each node operates either as a manager or as an agent. The manager supervises information included in the agents which are managed by the manager itself. A super manager is connected to the network for recognizing the node which operates as the manager which performs double supervision of the information in the agents with the manager. The super manager has a receiving unit for receiving information to be supervised by the node which operates as the manager, a detecting unit for detecting a failure of the node which operates as the manager, and a supervising unit for specifying information to be supervised by the faulty manager in accordance with information received by the receiving unit when the detecting unit detects the failure. The super manager supervises the object information to be supervised instead of the manager when the manager fails.

8 Claims, 8 Drawing Sheets

Fig. 6

```
ManagementFunction OBFECT-TYPE
    SYNTAX INTEGER {
                    manager (1)
                    non-manager (2)
                }
    ::= {xxxxxx}
```

Fig.7A

1:POLLING ADDRESS

| 192. 0. 2. 1 | (AGENT M+1) |
|---|---|
| 192. 0. 2. 2 | (AGENT M+2) |
| ⋮ | |
| 192. 0. 2. yy | (AGENT N) |

Fig.7B 92. 0. 2. 1

| xx.xx.xx.xx.xx.xx. |
|---|
| ⋮ |
| xx.xx.xx.xx.xx.xx. |

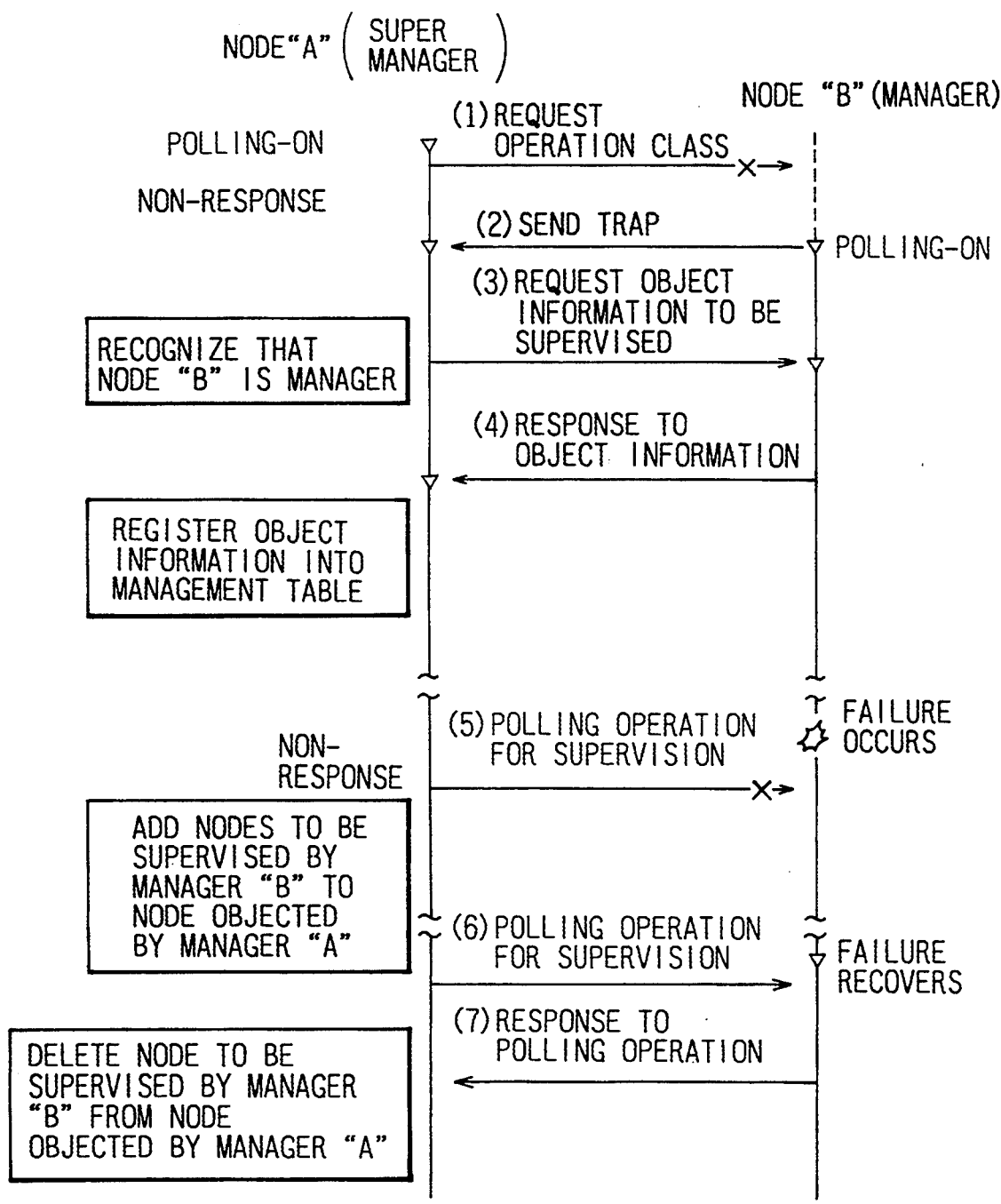

DATA PROCESSING SYSTEM HAVING DOUBLE SUPERVISING FUNCTIONS

BACKGROUND OF THE INVENTION

1. Field of the Invention

The present invention relates to a data processing system which is formed of a plurality of nodes each connected to networks. The nodes operate as either a manager or as an agent. Further, the manager supervises information in the agents which is covered (managed) by the manager itself. Particularly, it relates to a data processing system which can realize the supervision of information without an increase in traffic (i.e., various signals, data, messages, etc.) on the networks. In the present invention, a "super manager" is provided to supervise information instead of a faulty manager so that it is possible to realize double supervision by utilizing both the manager and the super manager.

2. Description of the Related Art

In a data processing system formed of a plurality of nodes connected to networks, there are nodes which operate as managers (below, manager nodes) and other nodes which operate as agents (below agent nodes). The nodes are previously specified in the networks. In this system, the manager node supervises information in the particular agents which are managed by the manager node, in response to polling operations to each of agents.

In the data processing system having above the structure, when a failure occurs in any manager, it is impossible for such a manager to supervise information in the agents.

Conventionally, in order to solve the above problem, a plurality of managers supervise the same information in the agents. That is, when the manager A supervises information in the agents "a", "b" and "c" in accordance with the polling operations to these agents, another manager B also supervises the same information included in the agents "a", "b" and "c" in accordance with the polling operations to these agents.

However, according to the above conventional art, there is a problem that the traffic on the networks considerably increases because a plurality of managers simultaneously perform the polling operations to the agents.

SUMMARY OF THE INVENTION

The object of the present invention is to provide a data processing system having a double supervising function enabling effective supervision of information in agents without an increase in traffic on the networks.

In accordance with the present invention, there is provided a data processing system which is formed of a plurality of nodes each connected to networks, each node operating either as a manager or as an agent, the manager supervising information in the agents which is managed by the manager itself, the system including: a super manager connected to the network for recognizing the node which operates as the manager, and performing double supervision of information in the agents with the manager, the super manager further including, a receiving unit for receiving information to be supervised by the node which operates as the manager, a detecting unit for detecting a failure of the node which operates as the manager, and a supervising unit for specifying information to be supervised by the faulty manager in accordance with information received by the receiving unit when the detecting unit detects the failure, and supervises object information to be supervised instead of the faulty manager.

In one preferred embodiment, the manager includes a communication unit for sending a notice which identifies the manager to the super manager when the manager starts operation, the super manager further comprising, a specifying unit for specifying the node which operates as the manager by querying all nodes connected to the networks when the super manager starts operation, a receiving unit for receiving object information to be supervised by the manager which is specified by the notice, and object information to be supervised by the manager which is specified by the specifying unit, a detecting unit for detecting a failure of the manager which is specified by the notice on a failure of the manager which is specified by the specifying unit, and a supervising unit for specifying information to be supervised by the faulty manager in accordance with information received by the receiving unit when the detecting unit detects failure, and the supervising unit supervising the specified information instead of the faulty manager.

In another preferred embodiment, when passwords are set on information to be supervised, the receiving unit receives the passwords in addition to information to be supervised, and the supervising unit performs the supervision for the information to be supervised by using the passwords.

In another preferred embodiment, any one manager is utilized as the super manager.

In still another preferred embodiment, the queries to all nodes are performed by a polling operation.

In still another preferred embodiment, the agents, managers and the super manager communicate in accordance with a standard communication protocol defined in the SNMP (Simple Network Management Protocol).

In still another preferred embodiment, the communication system includes a trap defined by the SNMP to define operation class.

In still another preferred embodiment, the operation class is defined by an expanded MIB (Management Information Base) in the SNMP.

BRIEF DESCRIPTION OF THE DRAWINGS

In the drawings:

FIG. 6 is a diagram which shows one example of a trap used to define an operation class to the super manager;

FIGS. 7A and 7B are diagrams showing one example of a management table;

FIG. 8 is a diagram which shows one example of a supervision process according to the present invention.

DESCRIPTION OF THE PREFERRED EMBODIMENTS

Figure 1:
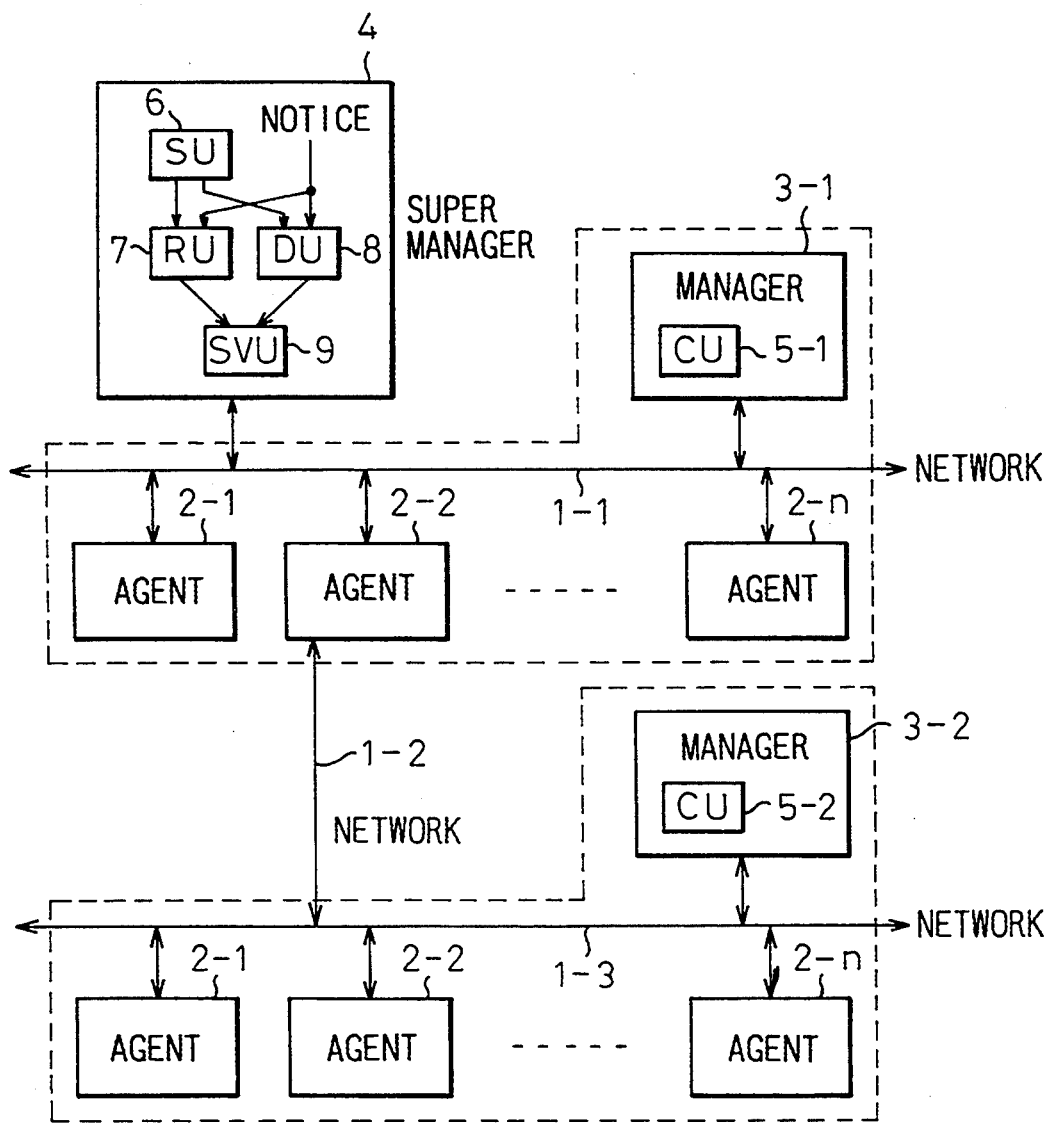
FIG. 1 is a block diagram of a data processing system according to the present invention.

FIG. 1 is a block diagram of a data processing system according to the present invention. A data processing system is formed of a plurality of nodes 2 (2-1 to 2-n) and 3 (3-1 and 3-2) connected through networks 1 (1—1 to 1-3). In general, each node 2 or 3 functions as a manager 3 or an agent 2 as explained in detail below. The "manager" and the "agent" are attached as follows.

The agents 2-1 to 2-n are each connected to the network 1 to perform a predetermined data process. The Managers 3-1 and 3-2 each supervise information in the corresponding agents 2 which are managed (covered) by a manager 3.

Further, a super manager 4 is connected to the network 1—1. The super manager 4 can operate instead of the manager 3 to perform the supervision of information included in the agents which are covered by the manager 3. Also, a manager 3 can operate instead of the super manager 4.

The manager 3 includes a communication unit (CU) 5 (5-1 and 5-2) to send a notice which indicates the manager to the super manager 4 through the network 1 when the manager 3 starts operation.

The super manager 4 includes a specifying unit (SU) 6, a receiving unit (RU) 7, a detecting unit (DU) 8 and a supervising unit (SVU) 9. The notice is input from the communication unit 5, and sent to the receiving unit 7 and the detecting unit 8.

The specifying unit 6 specifies the manager node (as mentioned above, the node which operates as the manager 3) by querying (polling) all nodes which are connected to the networks 1 when the super manager 4 starts operation. The receiving unit 7 receives information on what the manager node should supervise (i.e., object information to be supervised by the manager node). The detecting unit 8 detects a failure in the manager node. The supervising unit 9 performs supervising function instead of the manager 3 in the event of a failure in the manager 3.

According to the above structure, the super manager 4 can specify the particular node which operates as the manager 3 based on the notice within all nodes including both managers 3 which are operating before or after the super manager 4 starts operating.

When the manager node 3 is specified, the receiving unit 7 queries the particular managers 3, and receives the object information to be supervised by the particular manager 3. That is, the receiving unit 7 receives information which indicates the agents 2 objected by the particular manager 3 and the object information to be supervised by the agent 2. At that time, if passwords for information to be supervised are already set, the receiving unit 7 receives the corresponding passwords.

When the manager node 3 is specified based on the above process, the detecting unit 8 detects whether a failure has occurred in the specified manager 3 in accordance with the polling operations thereto. The supervising unit 9 receives the result of the polling operation from the detecting means 8. When the detecting unit 8 detects a failure, the supervising unit 9 specifies information to be supervised by the faulty manager 3 in accordance with information from the receiving unit 7. Further, the supervising unit 9 performs the supervision of information to be supervised instead of the faulty manager 3. At that time, when the passwords are received in the receiving unit 7, the supervising unit 9 supervises information to be supervised by designating the passwords.

As explained above, based on double supervision of information by using the manager and the super manager according to the present invention, it is possible to supervise information included in the agents based on the detection of the failure in the manager 3 and without polling the agents 2. Accordingly, it is possible to realize an effective supervision of information included in the agents without a substantial increase in activity on the networks 1.

Figure 2:
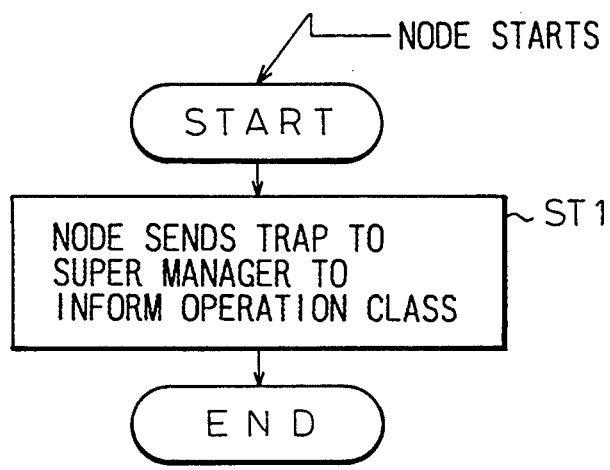
FIG. 2 is a process flowchart showing the process in a node when it starts operation.
Figure 3:
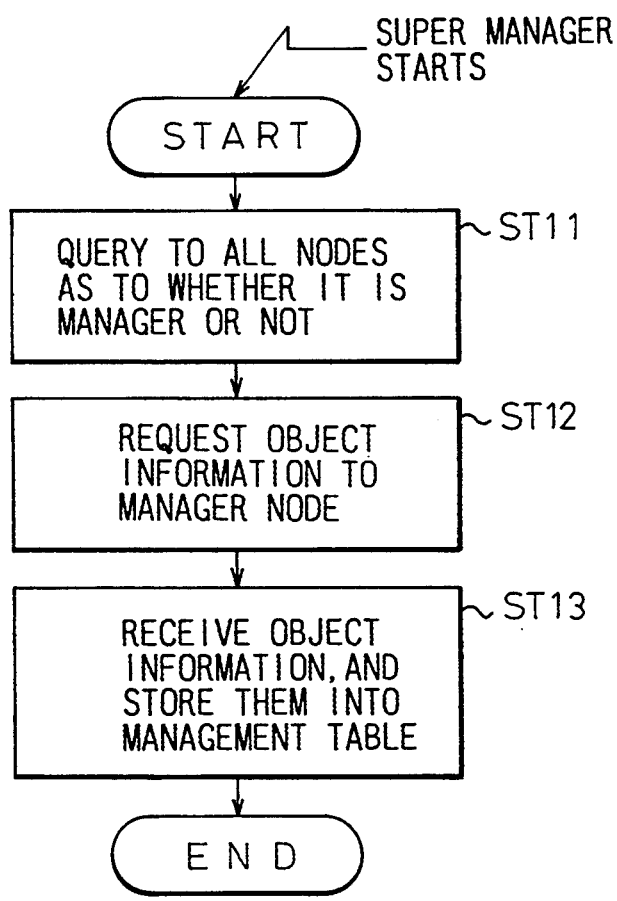
FIG. 3 is a process flowchart showing a process in a super manager when it starts operation.
Figure 4:
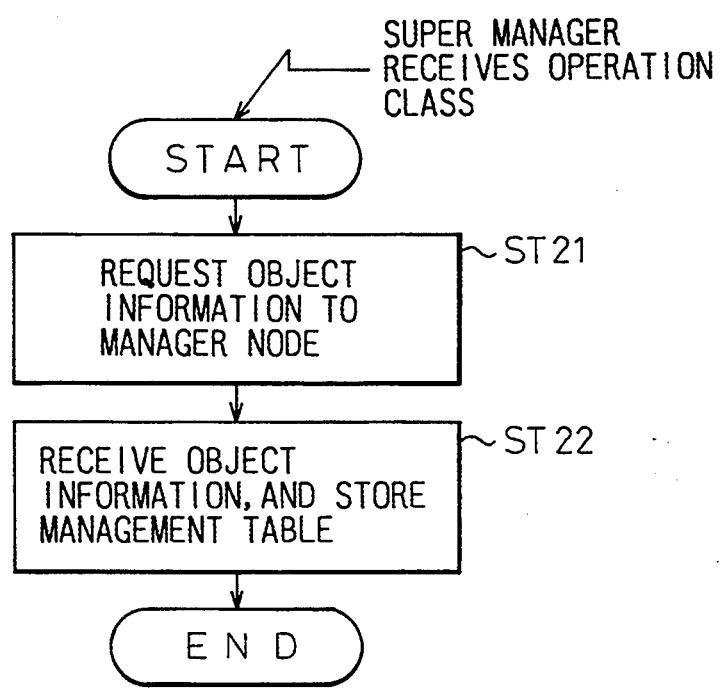
FIG. 4 is a process flowchart showing a process in the super manager when it receives an operation class notice from the node.
Figure 5:
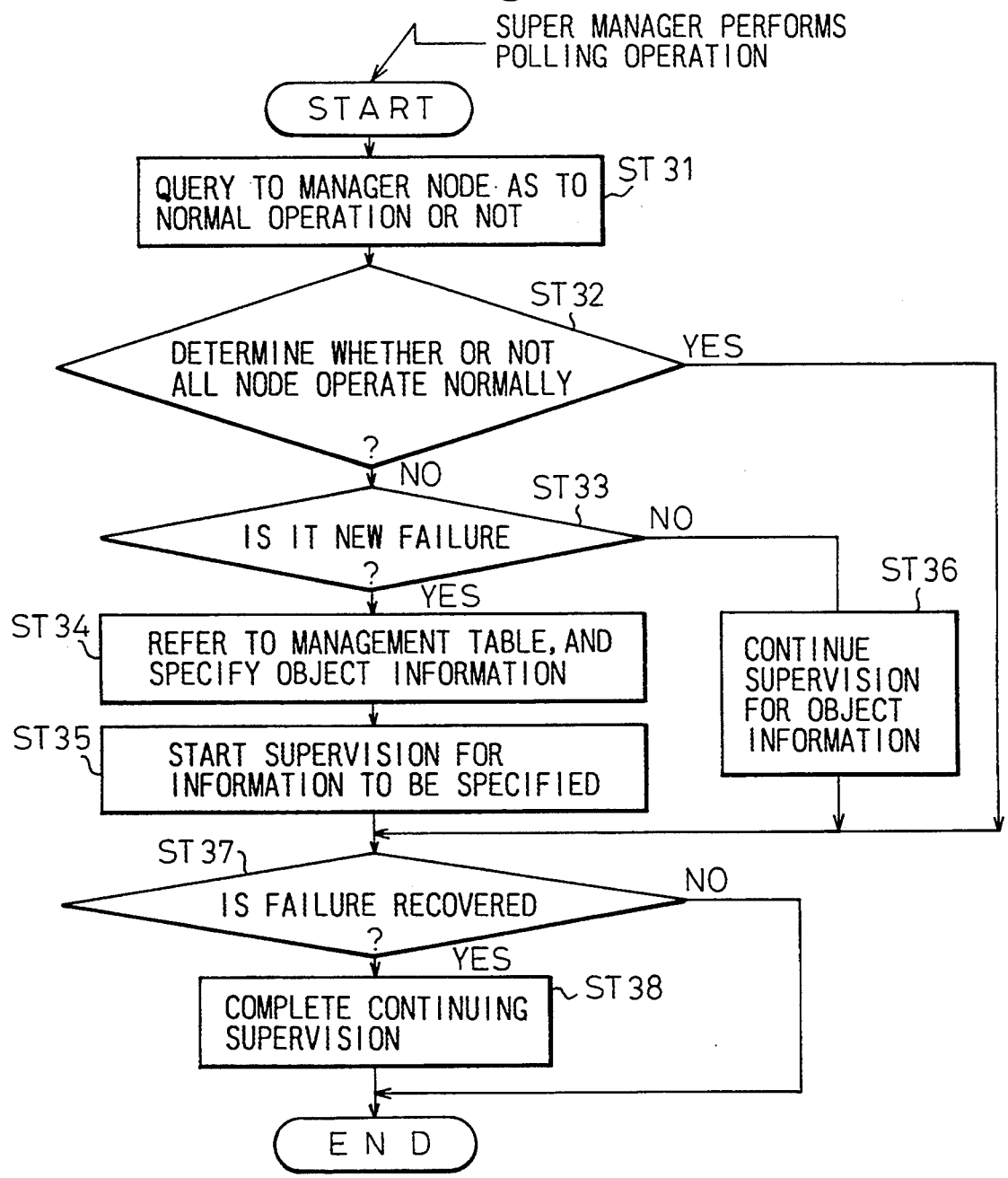
FIG. 5 is a process showing a process in the super manager during polling operations.

FIGS. 2 to 5 show process flowcharts of the operation of the data processing system according to an embodiment of the present invention. In detail, FIG. 2 is a process flowchart, showing the process of the node when it starts operation, FIG. 3 is a flowchart showing a process in the super manager when it starts operation, FIG. 4 is a flowchart which shows another example of the process in the super manager when it receives an operating class notice from the node, and FIG. 5 is a flowchart which shows still another example of the process in the super manager during the polling operations.

Further, FIG. 6 is a diagram which shows one example of a trap used to inform the operation class to the supper manager, and FIGS. 7A and 7B show one example of the management table.

In this embodiment, the agents 2, the managers 3 and the super manager 4 perform the communication among these units in accordance with the standard communication protocol which is defined in the SNMP (Simple Network Management Protocol).

As is known, the SNMP is a network managing protocol which is defined in TCP/IP (Transmission Control Protocol/Internet Protocol) which is used among universities, laboratories, etc., in the United States.

As shown in FIG. 2, when the node connected to the network 1 starts operation, the node sends a trap, which indicates a one-way communication means in the SNMP, to the super manager 4 by attaching an expanded MIB (Management Information Base) which indicates the operating class. That is, the node sends the trap to the super manager in order to define the operating class (step ST1). As is known, the MIB indicates a standardized structure and data base used as network managing information in the SNMP.

As shown in FIG. 6, the numeral "1" is added to the trap when the node operates as the manager 3 (see, manager (1) in FIG. 6), and the numeral "2" is added to the trap when the node operates as the agent 2 (see, non-manager (2) in FIG. 6). The node sends the trap, to which is attached the numeral (1) or (2), to the super manager 4.

In FIG. 3, when the super manager 4 starts operation, first, the super manager 4 queries all nodes connected to the networks 1 regarding whether or not it is the manager node (step ST11). Next, the super manager 4 requests transmission of the object information to be supervised to the manager node (step ST12). Further, the super manager 4 receives the object information and stores it into a management table (step ST13).

That is, when the super manager 4 starts operation, it receives information indicating the agents to be supervised by the manager 3 and the object information to be supervised by the agent, and stores this information in the management table.

In FIG. 7A, the manager A supervises the agents M+1 to N. In FIG. 7B, an identifier "xx" denotes information to be supervised. That is, this table shows information in the agent M+1, and information having an ID "xx" is supervised by the manager A. This is explained in detail below.

In FIG. 4, when the super manager 4 receives the notice of the operating class from the node connected to the network 1 (see, FIG. 2), the super manager 4 requests transmission of the object information to be supervised to the manager node (step ST21), receives the objected information to be supervised, and stores it into the management table (step ST22). As explained above, when the super manager 4 starts operation, it receives information indicating the agents to be supervised by the manager 3 and the object information to be supervised by the agent 2, and stores it into the management table as shown in FIGS. 7A and 7B. That is, the super manager 4 can specify the node which operates as the manager 3 (i.e., manager node) within the nodes connected to the networks 1 (in this case, the node includes all nodes which operate before/after the super manager 4 starts operation).

In FIG. 5, first, the super manager 4 queries the manager node as to whether or not it operates normally (step ST31) after the polling operation. Next, the super manager 4 determines whether or not all manager nodes operate normally (step ST32). When any one manager node does not operate normally (NO), i.e., when a failure has occurred in any manager node, the super manager 4 refers to the management table and specifies the object information to be supervised (step ST34).

That is, in step ST34, first, the super manager 4 determines whether or not the failure occurred just before the polling operation. When the failure occurred at this time (i.e., a new failure), the super manager 4 refers to the management table and specifies the object information to be supervised by the faulty manager 3.

Further, the super manager 4 starts to supervise the specified information (step ST35). That is, the super manager 4 supervises the object information to be supervised instead of the faulty manager 3.

On the contrary, when it is not new failure in step ST33 (NO), i.e., when it is the failure which occurred before a previous polling operation, the super manager 4 continues to supervise information which was supervised by the faulty manager 3 (step ST36).

When all nodes operate normally in step ST32 (YES), the super manager 4 determines whether or not the failure is still present (step ST37). That is, the super manager 4 determines whether or not the failure of the manager 3 disappeared during the present polling operation although it was faulty just before polling operation. In the above case, the super manager 4 stops supervising the information.

Figure 9:
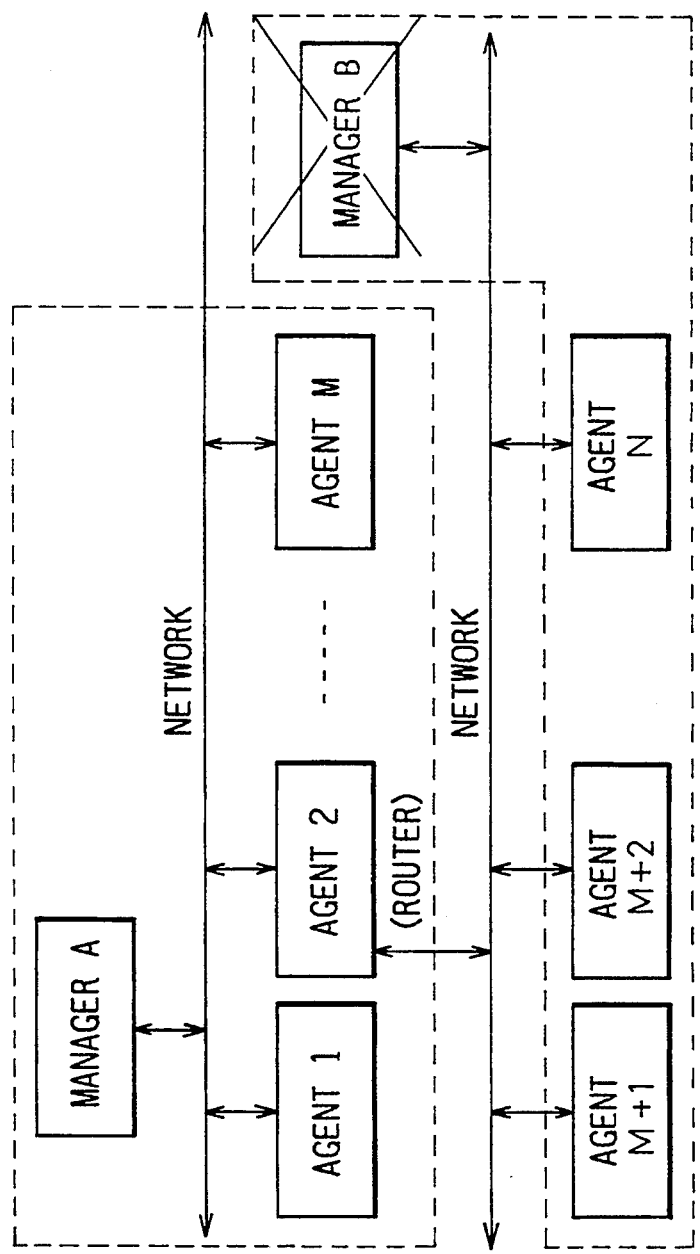
FIG. 9 is a block diagram which shows an example of a data processing system using the present invention.

FIG. 8 is a diagram which shows one example of a supervision process according to the present invention, and FIG. 9 is a block diagram which shows one example of a data processing system using the present invention.

First, in FIG. 9, the node A functions as the super manager 4, and supervises information included in the agents 1 to M. That is, the manager A covers (manages) the agents 1 to M. Further, the node (manager) supervises information included in the agents M+1 to N. That is, the manager B covers (manages) the agents M+1 to N. In this case, it is assumed that the failure occurs in the manager B and it disappeares after the manager A starts operation.

Referring once again to FIG. 8, the manager A (i.e., the super manager) requests the operation class to the manager B (step (1)). As mentioned above, although the manager B fails at this time, it is assumed that the manager B recovers after the manager A starts operation.

Accordingly, the manager B sends the trap which indicates itself to the manager A (step (2)).

The manager A recognizes that the node B is the manager, and requests that the object information is supervised by the manager B (i.e., passes the name of the agents to be supervised, passwords, name of information to be supervised to the manager B) (step (3)).

The manager B sends the object information to the manager A (step (4)). The manager A registers the object information in the management table.

Further, the manager A performs the polling operation to the manager B to supervise the manager B (step (5)). When the manager A detects the failure of the manager B based on a time-out of the polling from the manager B, the manager A refers to the management table and specifies information to be supervised by the manager B. Further, the manager A starts to supervise the information (i.e., information to be supervised included in the agents M+1 to N) by using the passwords which are included in the defined information. That is, the manager A adds nodes to be supervised by the manager B into the node defined by the manager A.

When the manager B recovers from the failure, the manager A again polls (step (6)) the manager B. The manager B returns the poll to the manager A (step (7)). When the manager A receives the poll from the manager B, the manager A stops supervising information to be supervised by the manager B. That is, the manager A deletes the nodes to be supervised by the manager B from the node defined by the manager A.

I claim:
1. A data processing system having a plurality of nodes each connected to at least one network, each node operating either as a manager node or as an agent node, each manager node being adapted to supervise information included in a set of agent nodes which are assigned to the manager node, said system comprising:
    a super manager connected to the at least one network for recognizing the nodes which operate as a manager node, and for performing double supervision, of information in the set of agent nodes assigned to each manager node,
    the super manager further comprising,
        a receiving means for receiving information to be supervised by each manager node,
        a detecting means for detecting a failure of a manager node, and
        a supervising means for specifying information supervised by a manager node which has failed in accordance with information received by the receiving means when the detecting means detects the failure, and for supervising the specified information instead of the manager node which has failed.

2. A data processing system as claimed in claim 1, wherein each of said manager nodes is provided with a communication means for sending a notice which identifies the manager node to the super manager when each manager node starts operation,
    said super manager further comprising:
        a specifying means for specifying the nodes which operates as a manager node by querying all nodes connected to the at least one network when the super manager starts operation, the receiving means being further adapted for receiving object information to be supervised by each manager node which is identified to the super manager, and object information to be supervised by the manager node which is specified by the specifying means, the detecting means being further adapted for detecting a failure of a manager node which is identified to the super manager, and a failure of a manager node which is specified by the specifying means.

3. A data processing system as claimed in claim 2, wherein when passwords are sent with the information to be supervised, said receiving means receives the passwords in addition to information to be supervised, and the supervising means performs the supervision of information to be supervised by using the passwords.

4. A data processing system as claimed in claim 1, wherein any one manager can be utilized as the super manager.

5. A data processing system as claimed in claim 2, wherein said specifying means performs querying to all nodes by a polling operation.

6. A data processing system as claimed in claim 1, wherein the agent nodes, manager nodes, and the super manager perform a communication process in accordance with a standard communication protocol defined in a SNMP (Simple Network Management Protocol).

7. A data processing system as claimed in claim 6, wherein the communication process includes a trap defined by the SNMP to define operating class.

8. A data processing system as claimed in claim 7, wherein the operation class is defined by an expanded MIB (Management Information Base) in the SNMP.

* * * * *

UNITED STATES PATENT AND TRADEMARK OFFICE
CERTIFICATE OF CORRECTION

PATENT NO. : 5,448,724
DATED : September 5, 1995
INVENTOR(S) : Yoko HAYASHI

It is certified that error appears in the above-indentified patent and that said Letters Patent is hereby corrected as shown below:

Col. 2, line 21, after "detects" insert --a--;
line 57, after "process" insert --flowchart--;
line 64, delete second occurrence of "a".

Col. 4, line 26, change "supper" to --super--.

Col. 5, line 63, after "node" insert --B--;
line 67, change "disappeares" to --disappears--.

Signed and Sealed this

Eleventh Day of June, 1996

Attest:

BRUCE LEHMAN

Attesting Officer

Commissioner of Patents and Trademarks